(12) United States Patent
Lin et al.

(10) Patent No.: US 9,885,822 B2
(45) Date of Patent: Feb. 6, 2018

(54) DISPLAY DEVICE

(71) Applicant: QISDA CORPORATION, Taoyuan (TW)

(72) Inventors: Jun-Da Lin, Taoyuan (TW); Yi-Cheng Kuo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 157 days.

(21) Appl. No.: 14/924,701

(22) Filed: Oct. 27, 2015

(65) Prior Publication Data

US 2016/0131820 A1 May 12, 2016

(30) Foreign Application Priority Data

Nov. 7, 2014 (TW) .................................. 103138705

(51) Int. Cl.
*G02B 6/00* (2006.01)
*F21V 8/00* (2006.01)

(52) U.S. Cl.
CPC ........... *G02B 6/0041* (2013.01); *G02B 6/005* (2013.01); *G02B 6/0058* (2013.01)

(58) Field of Classification Search
CPC .. G02B 6/0035; G02B 6/0041; G02B 6/0043; G02B 6/004; G02B 6/0058; G02B 6/005; F21K 9/64; F21K 9/61
See application file for complete search history.

(56) References Cited

U.S. PATENT DOCUMENTS

| | | | | |
|---|---|---|---|---|
| 6,991,359 B2 * | 1/2006 | Leu | ...................... | G02B 6/0061 362/346 |
| 8,430,519 B2 * | 4/2013 | Takata | ................. | G02B 6/0055 362/617 |
| 9,323,105 B2 * | 4/2016 | Hsu | ....................... | G02B 6/0043 |
| 2008/0285308 A1 * | 11/2008 | Clary | ..................... | G02B 6/004 362/619 |
| 2013/0176317 A1 * | 7/2013 | Li | ........................ | G02B 6/0035 345/501 |
| 2015/0247964 A1 * | 9/2015 | Kamada | ............... | G02B 6/0043 349/65 |

FOREIGN PATENT DOCUMENTS

| TW | 200408832 | 6/2004 |
|---|---|---|
| TW | 201040629 | 11/2010 |
| TW | 201314314 | 4/2013 |

* cited by examiner

*Primary Examiner* — Peggy Neils

(57) ABSTRACT

A display device includes a display panel and a backlight module. The display panel has an active area. The backlight module includes a light guide plate, a light converting film and a side-emitting light source. The light guide plate includes a plurality of first diffusion dots and a plurality of second diffusion dots, wherein the first diffusion dots are arranged corresponding to the active area, the second diffusion dots are arranged corresponding to a periphery of the active area, and a diameter of the second diffusion dot is smaller than a diameter of the first diffusion dot. The side-emitting light source is used for emitting a first color light into the light guide plate. The first diffusion dots and the second diffusion dots guide the first color light to the light converting film uniformly. The light converting film converts the first color light into a second color light.

15 Claims, 9 Drawing Sheets

DISPLAY DEVICE

CROSS-REFERENCE TO RELATED APPLICATIONS

This application claims the benefit of Taiwan Patent Application No. 103138705, filed Nov. 11, 2014, the entire disclosure of which is incorporated herein by reference.

BACKGROUND OF THE INVENTION

1. Field of the Invention

The invention relates to a display device and, more particularly, to a display device capable of preventing a light leak phenomenon.

2. Description of the Prior Art

So far a cold cathode fluorescent lamp (CCFL) or a light emitting diode (LED) may be used as a light source for a backlight module of a liquid crystal display (LCD) device. Since the LED is smaller and consumes less power than the CCFL, a product using the LED can be miniaturized and have good color saturation, and it will not cause mercury pollution. Accordingly, there is a tendency that the CCFL is being replaced by the LED gradually. Furthermore, so far a quantum dot enhancement film (QDEF) has been developed to cooperate with a blue LED, so as to enhance color rendering index and wide color gamut. The QDEF has two types of phosphor particles with different diameters. When the two types of phosphor particles are irradiated by blue light, the blue light will excite the two types of phosphor particles to generate red light and green light. Then, the red light, green light and partial blue light passing through the QDEF will mix with each other, so as to form white light at the other side of the QDEF.

In general, there is always no or few phosphor particles disposed at a periphery of the QDEF, such that the blue light emitted by the blue LED cannot be excited completely at the periphery of the QDEF. Consequently, a light leak phenomenon will be generated around an active area of a display panel. Still further, a plastic frame is usually disposed around the backlight module and the plastic frame may reflect the blue light emitted by the blue LED, such that the light leak phenomenon may be generated around the active area of the display panel and then result in nonuniform color.

SUMMARY OF THE INVENTION

An objective of the invention is to provide a display device capable of preventing a light leak phenomenon, so as to solve the aforesaid problems.

According to an embodiment of the invention, a display device comprises a display panel and a backlight module, wherein the display panel is disposed on the backlight module. The display panel has an active area. The backlight module comprises a light guide plate, a light converting film and a side-emitting light source. The light guide plate comprises a plurality of first diffusion dots and a plurality of second diffusion dots, wherein the first diffusion dots are arranged corresponding to the active area, the second diffusion dots are arranged corresponding to a periphery of the active area, and a diameter of the second diffusion dot is smaller than a diameter of the first diffusion dot. The light converting film is disposed on the light guide plate. The side-emitting light source is disposed beside the light guide plate and emits a first color light into the light guide plate. The first diffusion dots and the second diffusion dots guide the first color light to the light converting film uniformly. The light converting film converts the first color light into a second color light.

According to another embodiment of the invention, a display device comprises a display panel and a backlight module, wherein the display panel is disposed on the backlight module. The display panel has an active area. The backlight module comprises a light guide plate, a light converting film and a side-emitting light source. The light guide plate has a first area and a second area, wherein the first area is arranged corresponding to the active area and the second area is arranged corresponding to a periphery of the active area. The light converting film is disposed on the light guide plate. The side-emitting light source is disposed beside the light guide plate and emits a first color light into the light guide plate. An intensity of the first color light guided by the first area to the light converting film is larger than an intensity of the first color light guided by the second area to the light converting film. The light converting film converts the first color light into a second color light.

As mentioned in the above, the invention arranges the first diffusion dots with larger diameter on the light guide plate corresponding to the active area and arranges the second diffusion dots with smaller diameter on the light guide plate corresponding to the periphery of the active area, such that the first and second diffusion dots with different diameters can guide the light emitted by the light source to the light converting film uniformly, so as to prevent the light leak phenomenon from being generated around the active area of the display panel. Furthermore, the invention utilizes the second area of the light guide plate corresponding to the periphery of the active area to reduce the intensity of the light, so as to prevent the light leak phenomenon from being generated around the active area of the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
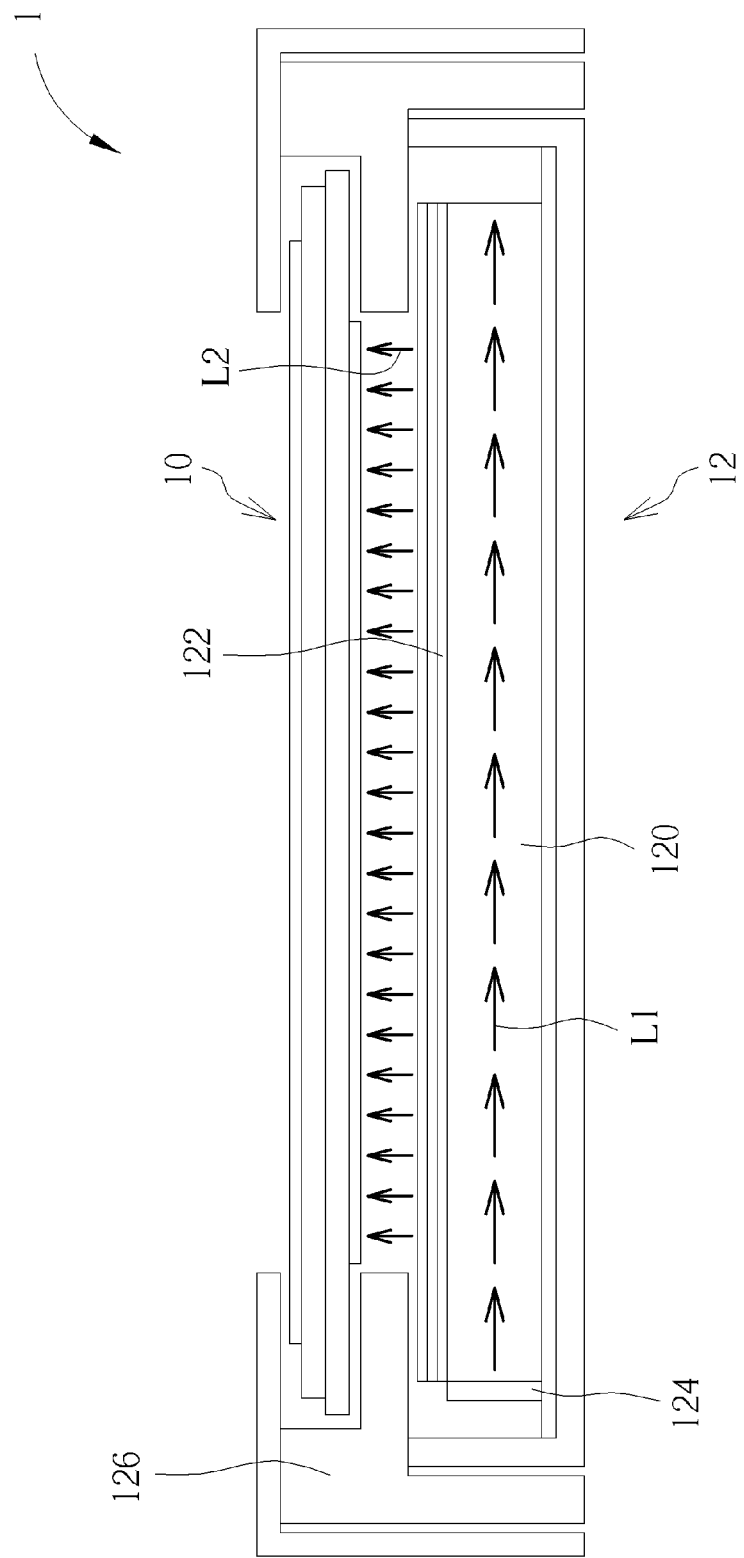
FIG. 1 is a schematic view illustrating a display device according to an embodiment of the invention.
Figure 2:
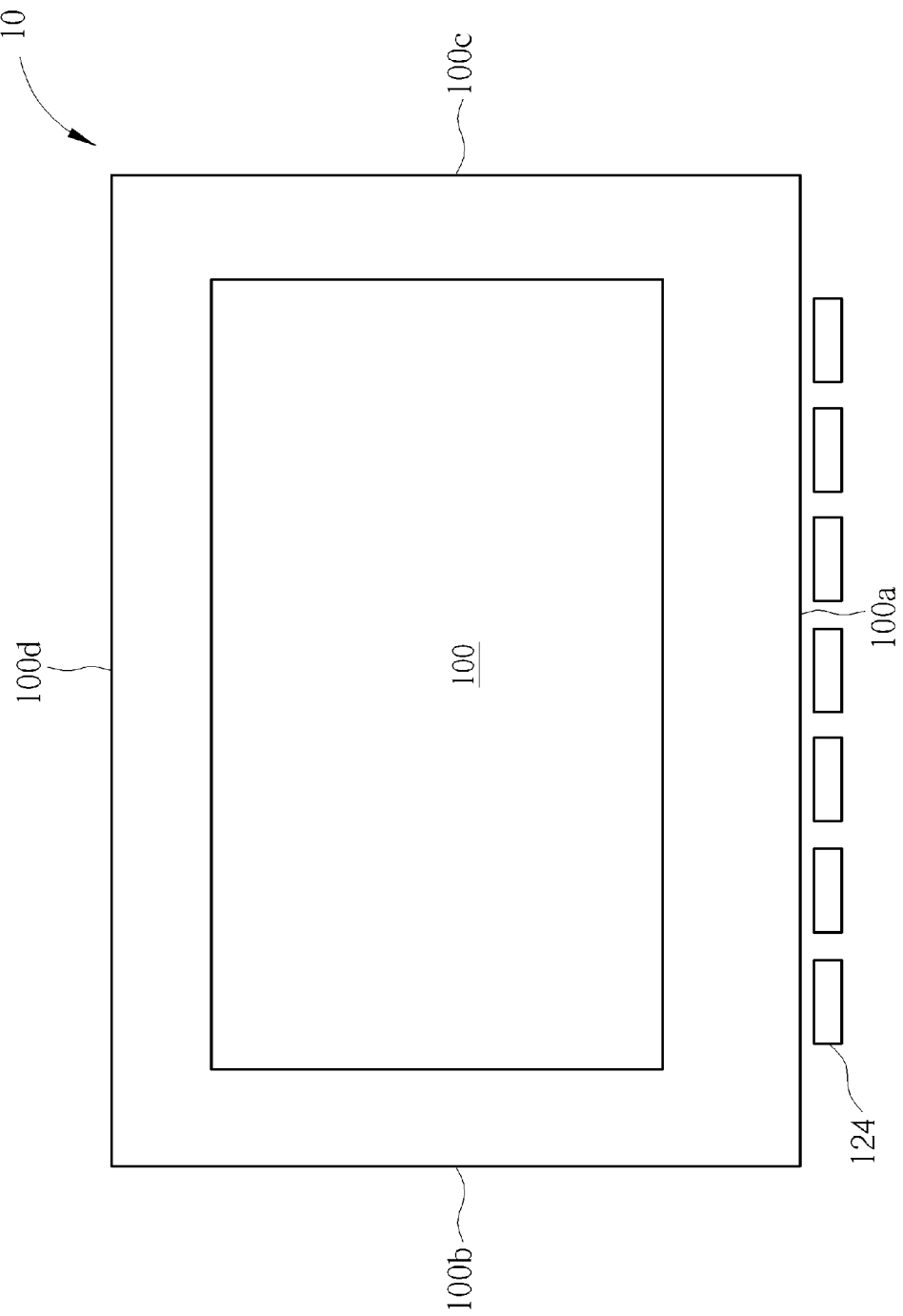
FIG. 2 is a top view illustrating the display panel and the side-emitting light source shown in FIG. 1.
Figure 3:
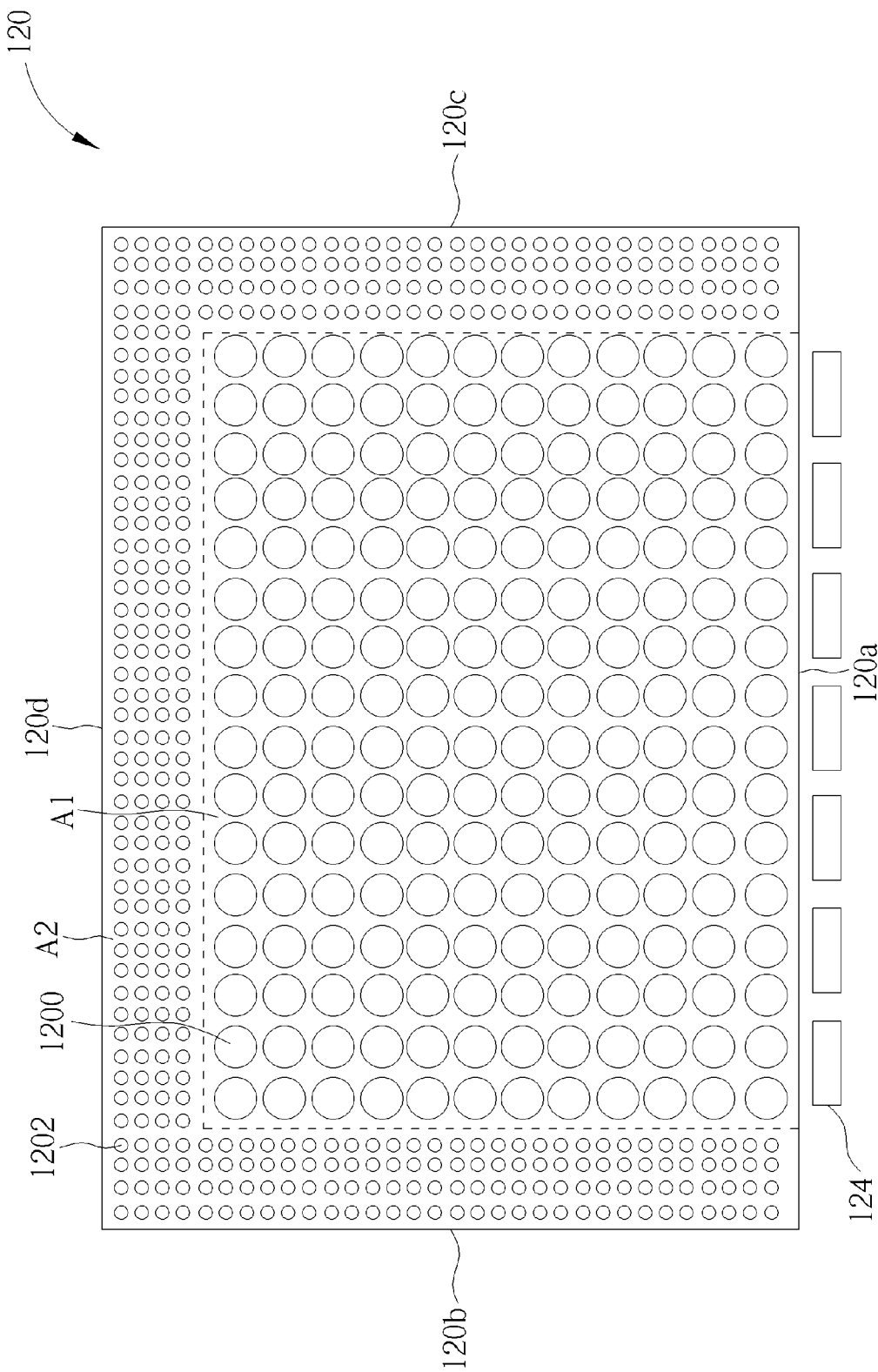
FIG. 3 is a top view illustrating the light guide plate and the side-emitting light source shown in FIG. 1.

Referring to FIGS. 1 to 3, FIG. 1 is a schematic view illustrating a display device 1 according to an embodiment of the invention, FIG. 2 is a top view illustrating the display panel 10 and the side-emitting light source 124 shown in FIG. 1, and FIG. 3 is a top view illustrating the light guide plate 120 and the side-emitting light source 124 shown in FIG. 1. As shown in FIG. 1, the display device 1 comprises a display panel 10 and a backlight module 12, wherein the display panel 10 is disposed on the backlight module 12. In this embodiment, the display device 1 may be, but not limited to, a liquid crystal display (LCD) device and the display panel 10 may be, but not limited to, an LCD panel. The display panel 10 has an active area 100. In general, a black matrix (BM) is formed around the display panel 10 and the active area 100 is represented by an area within the black matrix to show text and image for a user.

The backlight module 12 comprises a light guide plate 120, a light converting film 122, a side-emitting light source 124 and a frame 126. The light guide plate 120, the light converting film 122 and the side-emitting light source 124 are disposed within the frame 126. In this embodiment, the frame 126 may be, but not limited to, a plastic frame. The light converting film 122 is disposed on the light guide plate 120 and the side-emitting light source 124 is disposed beside the light guide plate 120. Furthermore, an optical film assembly may be disposed on the light converting film 122 to improve optical characteristic of the light, wherein the optical film assembly may comprise a prism film, a diffusion film and so on according to practical applications.

As shown in FIG. 2, the display panel 10 has a first edge 100a, a second edge 100b, a third edge 100c and a fourth edge 100d surrounding the active area 100, wherein the first edge 100a is adjacent to the second edge 100b and the third edge 100c, and the first edge 100a is opposite to the fourth edge 100d. The side-emitting light source 124 is arranged corresponding to the first edge 100a.

As shown in FIG. 3, the light guide plate 120 has a first area A1 and a second area A2, wherein the first area A1 is arranged corresponding to the active area 100 and the second area A2 is arranged corresponding to a periphery of the active area 100. In this embodiment, the light guide plate 120 comprises a plurality of first diffusion dots 1200 and a plurality of second diffusion dots 1202, wherein the first diffusion dots 1200 are disposed in the first area A1 and the second diffusion dots 1202 are disposed in the second area A2. Since the first area A1 is arranged corresponding to the active area 100 and the second area A2 is arranged corresponding to the periphery of the active area 100, the first diffusion dots 1200 are arranged corresponding to the active area 100 and the second diffusion dots 1202 are arranged corresponding to the periphery of the active area 100. It should be noted that the range of the first area A1 and the second area A2 may be determined according to practical light requirement. Still further, a diameter of the second diffusion dot 1202 is smaller than a diameter of the first diffusion dot 1200. Preferably, the diameter of the first diffusion dot 1200 may be larger than, but not limited to, 300 μm and the diameter of the second diffusion dot 1202 may be smaller than, but not limited to, 150 μm.

Moreover, the light guide plate 120 has a first edge 120a, a second edge 120b, a third edge 120c and a fourth edge 120d, wherein the first edge 120a is adjacent to the second edge 120b and the third edge 120c, and the first edge 120a is opposite to the fourth edge 120d. After the display panel 10 is disposed on the backlight module 12, the first edge 100a, the second edge 100b, the third edge 100c and the fourth edge 100d of the display panel 100 correspond to the first edge 120a, the second edge 120b, the third edge 120c and the fourth edge 120d of the light guide plate 120, respectively. Accordingly, the side-emitting light source 124 is also arranged corresponding to the first edge 120a.

In this embodiment, the second diffusion dots 1202 are arranged in the second area A2 of the light guide plate 120 corresponding to the second edge 100b, the third edge 100c and the fourth edge 100d of the display panel 10. However, the second diffusion dots 1202 may be also arranged in the second area A2 of the light guide plate 120 corresponding to one or two of the second edge 100b, the third edge 100c and the fourth edge 100d of the display panel 10 according to practical applications.

The side-emitting light source 124 is used for emitting a first color light L1 into the light guide plate 120. Since the diameter of the second diffusion dot 1202 is smaller than the diameter of the first diffusion dot 1200, an intensity of the first color light L1 guided by the first diffusion dots 1200 of the first area A1 to the light converting film 122 is larger than an intensity of the first color light L1 guided by the second diffusion dots 1202 of the second area A2 to the light converting film 122. Accordingly, the first diffusion dots 1200 and the second diffusion dots 1202 can guide the first color light L1 to the light converting film 122 uniformly, so as to prevent a light leak phenomenon from being generated around the active area 100 of the display panel 10. After the first diffusion dots 1200 and the second diffusion dots 1202 guide the first color light L1 to the light converting film 122 uniformly, the light converting film 122 converts the first color light L1 into a second color light L2 toward the display panel 10.

In general, buttons or other hardware components may be disposed at an area between the active area 100 and the first edge 100a of the display panel 10 (i.e. light incident side), such that a width between the active area 100 and the first edge 100a of the display panel 10 may be larger than the widths of the other three sides. Accordingly, the light leak phenomenon will not be generated at the first edge 100a of the display panel 10 easily.

In this embodiment, the light converting film 122 may be a quantum dot enhancement film (QDEF). The QDEF is used for cooperating with a blue light source, so as to enhance color rendering index and wide color gamut. The QDEF has two types of phosphor particles with different diameters. When the two types of phosphor particles are irradiated by blue light, the blue light will excite the two types of phosphor particles to generate red light and green light. Then, the red light, green light and partial blue light passing through the QDEF will mix with each other, so as to form white light at the other side of the QDEF. Therefore, when the light converting film 122 is a QDEF, the side-emitting light source can emit blue light, such as a blue light emitting diode (LED). At this time, the aforesaid first color light L1 is blue light and the aforesaid second color light L2 is white light.

Figure 4:
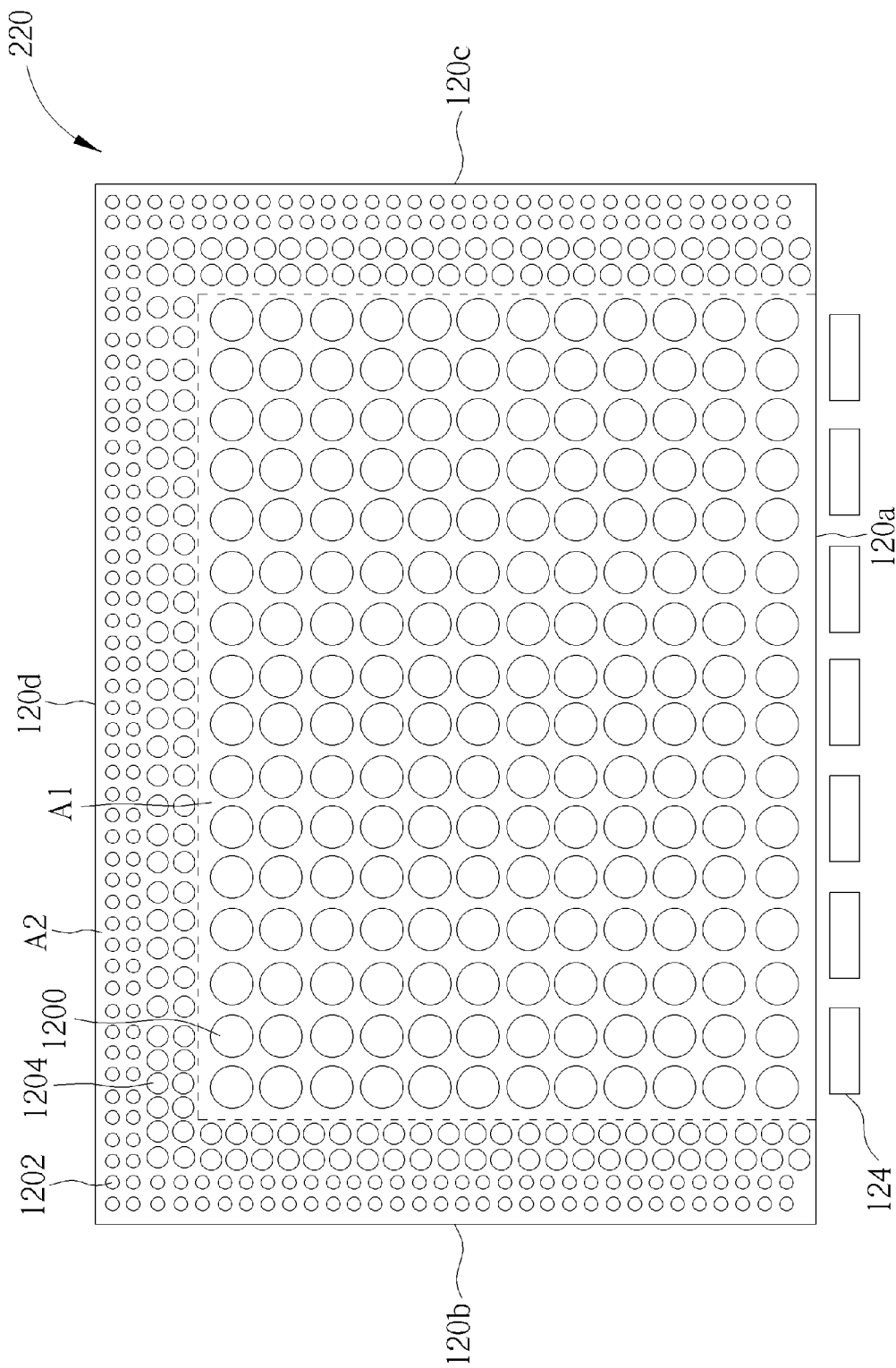
FIG. 4 is a top view illustrating a light guide plate and a side-emitting light source according to another embodiment of the invention.

Referring to FIG. 4, FIG. 4 is a top view illustrating a light guide plate 220 and a side-emitting light source 124 according to another embodiment of the invention. The main difference between the light guide plate 220 and the aforesaid light guide plate 120 is that the light guide plate 220 further comprises a plurality of third diffusion dots 1204, as shown in FIG. 4. In this embodiment, the third diffusion dots 1204 are also arranged in the second area A2 corresponding to the periphery of the active area 100 of the display panel 10. Furthermore, a diameter of the third diffusion dot 1204 is smaller than the diameter of the first diffusion dot 1200 and larger than the diameter of the second diffusion dot 1202. Preferably, the diameter of the third diffusion dot 1204 may be larger than or equal to, but not limited to, 150 μm and smaller than or equal to, but not limited to, 300 μm. In this embodiment, the second diffusion dots 1202 are relatively far away from the active area 100 of the display panel 10 and the third diffusion dots 1204 are relatively close to the active area 100 of the display panel 10. When the light guide plate 120 shown in FIG. 1 is replaced by the light guide plate 220 shown in FIG. 4, an intensity of the first color light L1 guided by the first diffusion dots 1200 of the first area A1 to the light converting film 122 will be larger than an intensity of the first color light L1 guided by the second diffusion dots 1202 and the third diffusion dots 1204 of the second area A2 to the light converting film 122. Accordingly, the first diffusion dots 1200, the second diffusion dots 1202 and the third diffusion dots 1204 can guide the first color light L1 to the light converting film 122 uniformly, so as to prevent a light leak phenomenon from being generated around the active area 100 of the display panel 10. It should be noted that the same elements in FIG. 4 and FIG. 3 are represented by the same numerals, so the repeated explanation will not be depicted herein again.

Figure 5:
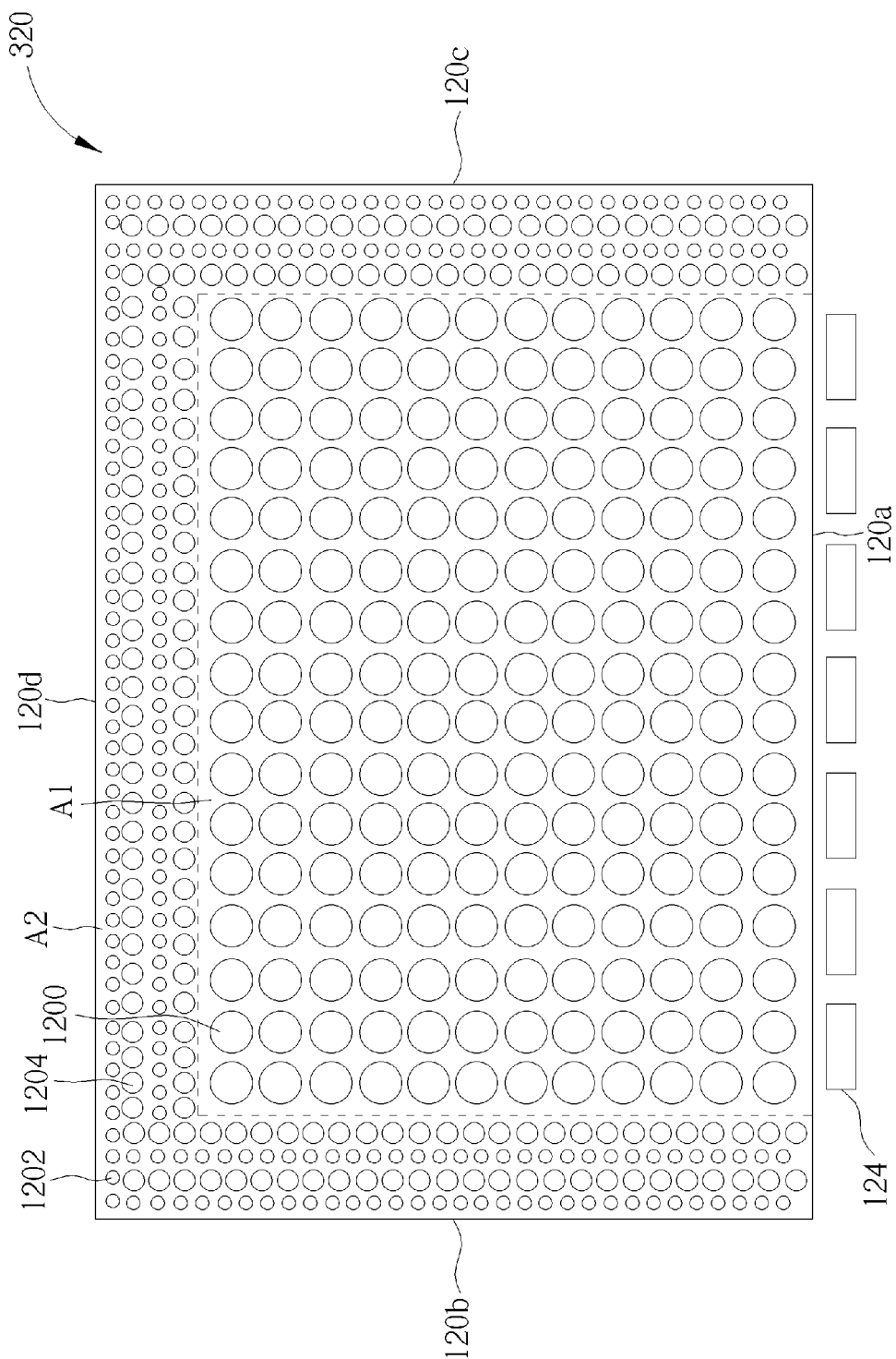
FIG. 5 is a top view illustrating a light guide plate and a side-emitting light source according to another embodiment of the invention.

Referring to FIG. 5, FIG. 5 is a top view illustrating a light guide plate 320 and a side-emitting light source 124 according to another embodiment of the invention. The main difference between the light guide plate 320 and the aforesaid light guide plate 220 is that the second diffusion dots 1202 and the third diffusion dots 1204 of the light guide plate 320 mix with each other. It should be noted that the same elements in FIG. 5 and FIG. 4 are represented by the same numerals, so the repeated explanation will not be depicted herein again.

Figure 6:
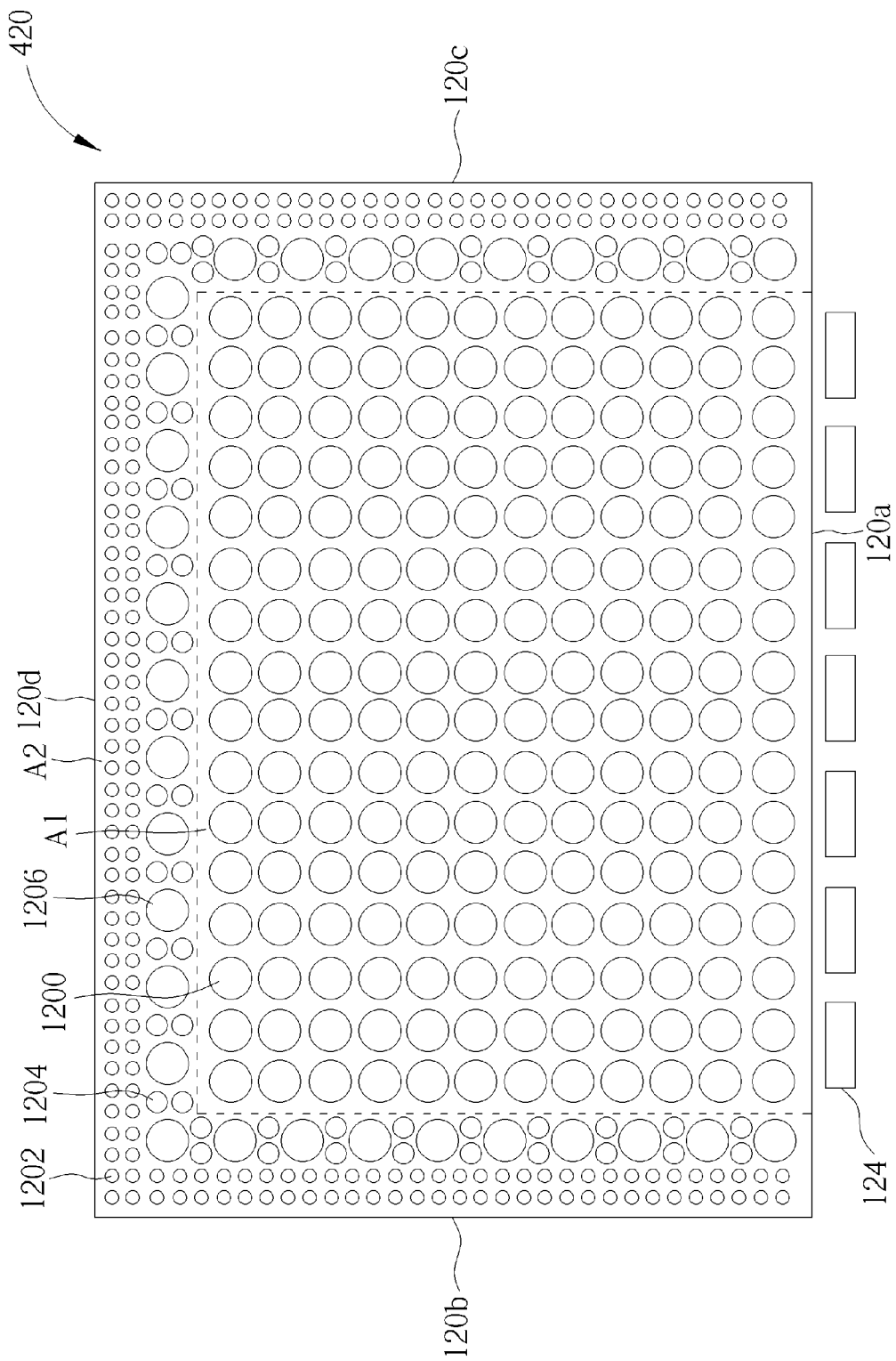
FIG. 6 is a top view illustrating a light guide plate and a side-emitting light source according to another embodiment of the invention.

Referring to FIG. 6, FIG. 6 is a top view illustrating a light guide plate 420 and a side-emitting light source 124 according to another embodiment of the invention. The main difference between the light guide plate 420 and the aforesaid light guide plate 220 is that the light guide plate 420 further comprises a plurality of fourth diffusion dots 1206, as shown in FIG. 6. In this embodiment, the fourth diffusion dots 1206 are also arranged in the second area A2 corresponding to the periphery of the active area 100 of the display panel 10. Furthermore, a diameter of the fourth diffusion dot 1206 is equal to the diameter of the first diffusion dot 1200. In this embodiment, the second diffusion dots 1202 are relatively far away from the active area 100 of the display panel 10, and the third diffusion dots 1204 and the fourth diffusion dots 1206 mix with each other and relatively close to the active area 100 of the display panel 10. When the light guide plate 120 shown in FIG. 1 is replaced by the light guide plate 420 shown in FIG. 6, an intensity of the first color light L1 guided by the first diffusion dots 1200 of the first area A1 to the light converting film 122 will be larger than an intensity of the first color light L1 guided by the second diffusion dots 1202, the third diffusion dots 1204 and the fourth diffusion dots 1206 of the second area A2 to the light converting film 122. Accordingly, the first diffusion dots 1200, the second diffusion dots 1202, the third diffusion dots 1204 and the fourth diffusion dots 1206 can guide the first color light L1 to the light converting film 122 uniformly, so as to prevent a light leak phenomenon from being generated around the active area 100 of the display panel 10. It should be noted that the same elements in FIG. 6 and FIG. 4 are represented by the same numerals, so the repeated explanation will not be depicted herein again.

Figure 7:
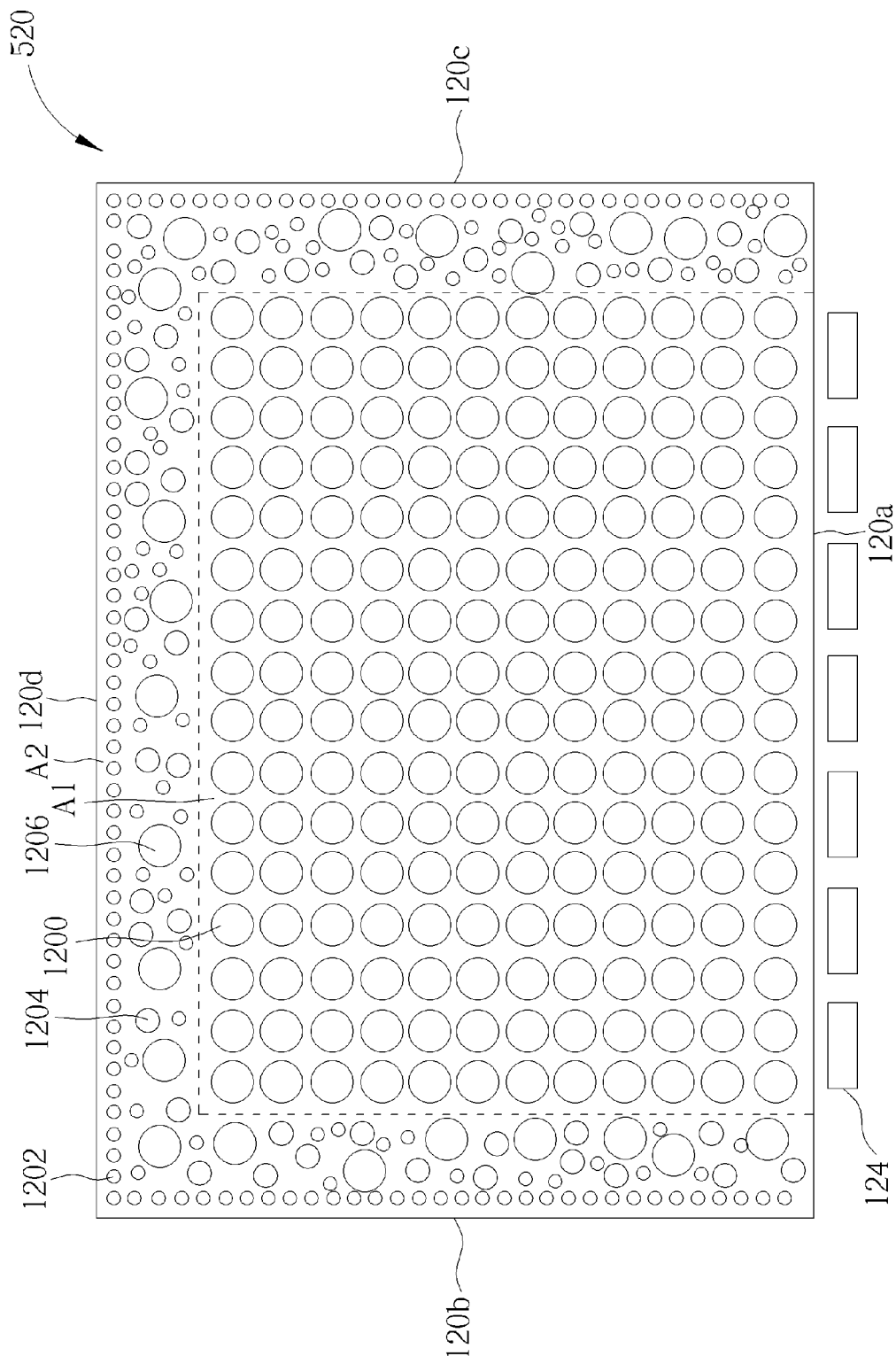
FIG. 7 is a top view illustrating a light guide plate and a side-emitting light source according to another embodiment of the invention.

Referring to FIG. 7, FIG. 7 is a top view illustrating a light guide plate 520 and a side-emitting light source 124 according to another embodiment of the invention. The main difference between the light guide plate 520 and the aforesaid light guide plate 420 is that the second diffusion dots 1202, the third diffusion dots 1204 and the fourth diffusion dots 1206 of the light guide plate 520 mix with each other. It should be noted that the same elements in FIG. 7 and FIG. 6 are represented by the same numerals, so the repeated explanation will not be depicted herein again.

Figure 8:
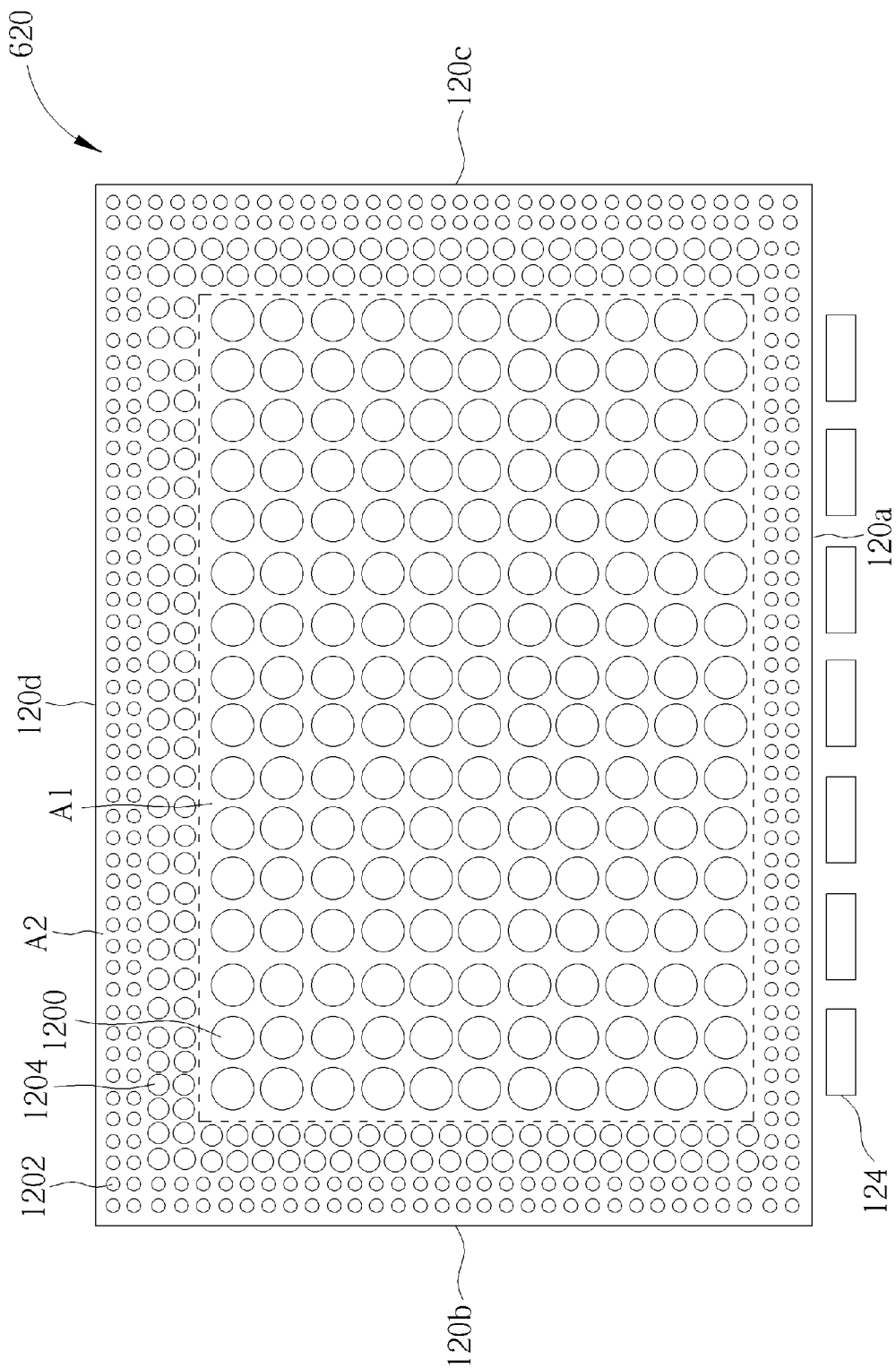
FIG. 8 is a top view illustrating a light guide plate and a side-emitting light source according to another embodiment of the invention.

Referring to FIG. 8, FIG. 8 is a top view illustrating a light guide plate 620 and a side-emitting light source 124 according to another embodiment of the invention. The main difference between the light guide plate 620 and the aforesaid light guide plate 220 is that the range of the second area A2 of the light guide plate 620 covers the first edge 120a and the second diffusion dots 1202 are further disposed in the second area A2 corresponding to the first edge 120a. Since the first edge 120a of the light guide plate 620 corresponds to the first edge 100a of the display panel 10, the light guide plate 620 can further prevent a light leak phenomenon from being generated at the first edge 100a of the display panel 10 and prevent nonuniform brightness from being generated at the first edge 100a due to strong light. It should be noted that the same elements in FIG. 8 and FIG. 4 are represented by the same numerals, so the repeated explanation will not be depicted herein again.

Figure 9:
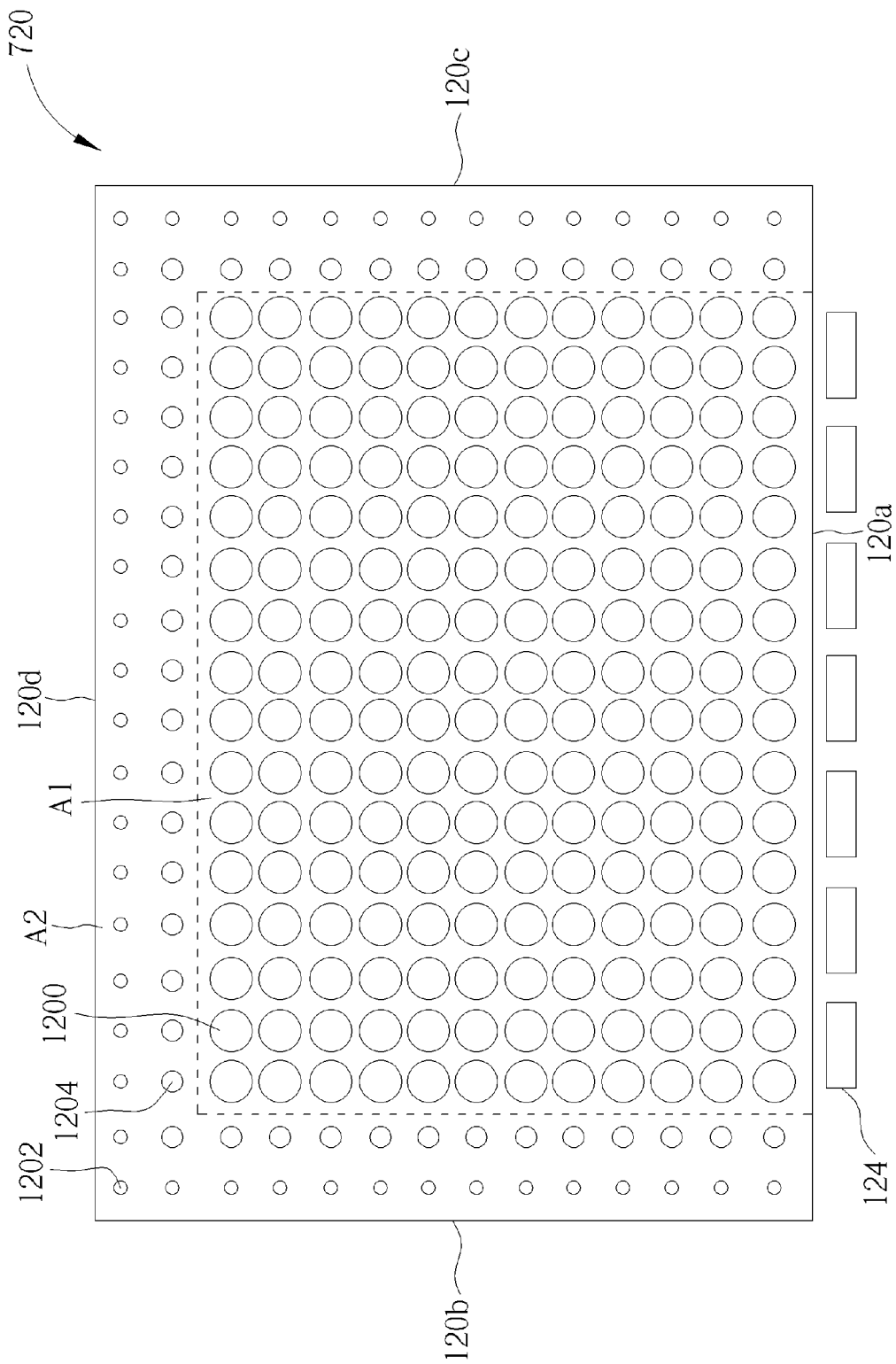
FIG. 9 is a top view illustrating a light guide plate and a side-emitting light source according to another embodiment of the invention.

Referring to FIG. 9, FIG. 9 is a top view illustrating a light guide plate 720 and a side-emitting light source 124 according to another embodiment of the invention. The main difference between the light guide plate 720 and the aforesaid light guide plate 220 is that, in the light guide plate 720, a density of the second diffusion dots 1202 and the third diffusion dots 1204 in the second area A2 is substantially equal to a density of the first diffusion dots 1200 in the first area A1. In other words, the invention may adjust the arrangement and density of the diffusion dots according to practical light requirement, so as to prevent a light leak phenomenon from being generated around the active area 100 of the display panel 10. It should be noted that the same elements in FIG. 9 and FIG. 4 are represented by the same numerals, so the repeated explanation will not be depicted herein again.

As mentioned in the above, the invention arranges the first diffusion dots with larger diameter on the light guide plate corresponding to the active area and arranges the second diffusion dots with smaller diameter on the light guide plate corresponding to the periphery of the active area, such that the first and second diffusion dots with different diameters can guide the light emitted by the light source to the light converting film uniformly. Since the second diffusion dots with smaller diameter are disposed in the second area of the light guide plate corresponding to the periphery of the active area, the second area of the light guide plate corresponding to the periphery of the active area can reduce the intensity of the light effectively, so as to prevent the light leak phenomenon from being generated around the active area of the display panel. Furthermore, the invention may dispose the third diffusion dots and/or the fourth diffusion dots with other diameters in the second area of the light guide plate corresponding to the periphery of the active area according to practical light requirement.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A display device comprising:
a display panel having an active area, a first edge, a second edge, a third edge and a fourth edge surrounding the active area, the first edge is adjacent to the second edge and the third edge, the first edge is opposite to the fourth edge; and
a backlight module, the display panel being disposed on the backlight module, the backlight module comprising:
a light guide plate comprising a plurality of first diffusion dots and a plurality of second diffusion dots, the first diffusion dots being arranged corresponding to the active area, the second diffusion dots being arranged corresponding to a periphery of the active area, the second edge and the third edge, a diameter of the second diffusion dot being smaller than a diameter of the first diffusion dot;
a light converting film disposed on the light guide plate; and
a side-emitting light source disposed only beside the light guide plate corresponding to the first edge, the side-emitting light source emitting a first color light into the light guide plate;
wherein the first diffusion dots and the second diffusion dots guide the first color light to the light converting film uniformly, and the light converting film converts the first color light into a second color light.

2. The display device of claim 1, wherein the second diffusion dots are further arranged corresponding to the fourth edge.

3. The display device of claim 1, wherein the light guide plate further comprises a plurality of third diffusion dots arranged corresponding to the periphery of the active area, and a diameter of the third diffusion dot is smaller than the diameter of the first diffusion dot and larger than the diameter of the second diffusion dot.

4. The display device of claim 3, wherein the diameter of the first diffusion dot is larger than 300 μm, the diameter of the second diffusion dot is smaller than 150 μm, and the diameter of the third diffusion dot is larger than or equal to 150 μm and smaller than or equal to 300 μm.

5. The display device of claim 3, wherein the second diffusion dots are relatively far away from the active area and the third diffusion dots are relatively close to the active area.

6. The display device of claim 3, wherein the second diffusion dots and the third diffusion dots mix with each other.

7. The display device of claim 3, wherein the light guide plate further comprises a plurality of fourth diffusion dots arranged corresponding to the periphery of the active area, and a diameter of the fourth diffusion dot is equal to the diameter of the first diffusion dot.

8. The display device of claim 7, wherein the second diffusion dots are relatively far away from the active area, and the third diffusion dots and the fourth diffusion dots mix with each other and relatively close to the active area.

9. The display device of claim 7, wherein the second diffusion dots, the third diffusion dots and the fourth diffusion dots mix with each other.

10. The display device of claim 1, wherein the light converting film is a quantum dot enhancement film, the first color light is blue light, and the second color light is white light.

11. A display device comprising:
a display panel having an active area, a first edge, a second edge, a third edge and a fourth edge surrounding the active area, the first edge is adjacent to the second edge and the third edge, the first edge is opposite to the fourth edge; and
a backlight module, the display panel being disposed on the backlight module, the backlight module comprising:
a light guide plate having a first area and a second area, the first area being arranged corresponding to the active area and an area extending from the active area to the first edge, the second area being arranged corresponding to a periphery of the first area, the light guide plate comprises a plurality of first diffusion dots and a plurality of second diffusion dots, the first diffusion dots are disposed in the first area, the second diffusion dots are disposed only in the second area and arranged corresponding to the second edge and the third edge, and a diameter of the second diffusion dot is smaller than a diameter of the first diffusion dot;
a light converting film disposed on the light guide plate; and
a side-emitting light source disposed beside the light guide plate and arranged corresponding to the first edge, the side-emitting light source emitting a first color light into the light guide plate;
wherein an intensity of the first color light guided by the first area to the light converting film is larger than an intensity of the first color light guided by the second area to the light converting film, and the light converting film converts the first color light into a second color light.

12. The display device of claim 11, wherein the second diffusion dots are further arranged corresponding to the fourth edge.

13. The display device of claim 11, wherein the light guide plate further comprises a plurality of third diffusion dots arranged corresponding to the periphery of the active area, and a diameter of the third diffusion dot is smaller than the diameter of the first diffusion dot and larger than the diameter of the second diffusion dot.

14. The display device of claim 13, wherein the diameter of the first diffusion dot is larger than 300 μm, the diameter of the second diffusion dot is smaller than 150 μm, and the diameter of the third diffusion dot is larger than or equal to 150 μm and smaller than or equal to 300 μm.

15. The display device of claim 11, wherein the light converting film is a quantum dot enhancement film, the first color light is blue light, and the second color light is white light.

* * * * *